Dec. 16, 1924.
F. P. MAXSON
FISH SCALER
Filed July 23, 1923
1,519,689
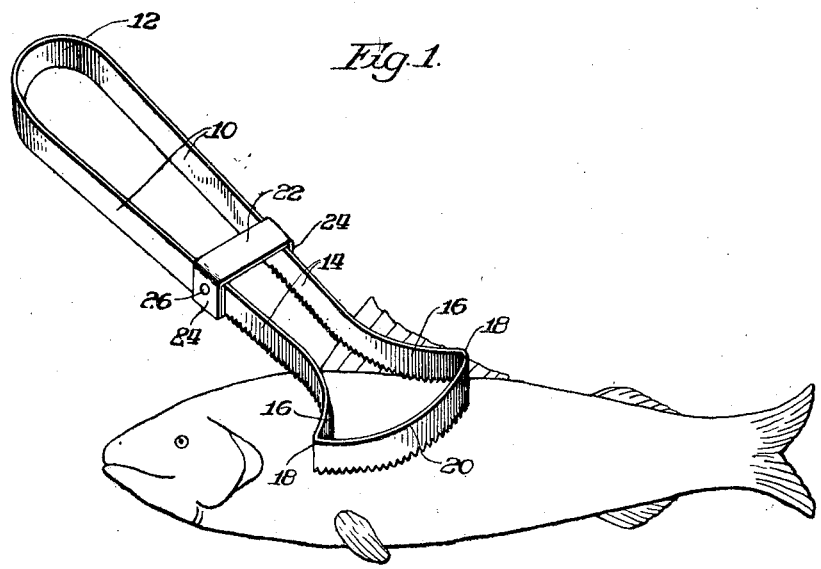
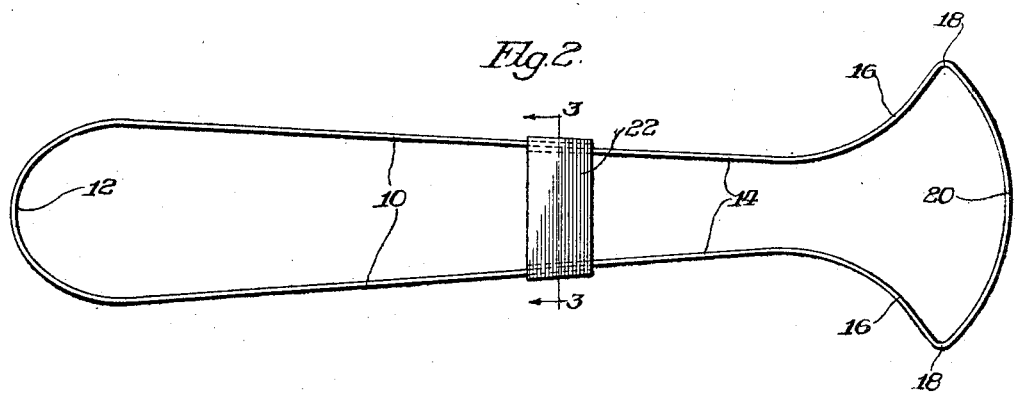
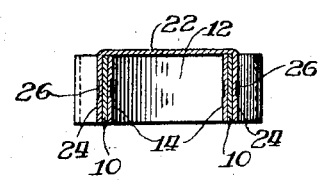
Witness:
Inventor:
Frank P. Maxson.

Patented Dec. 16, 1924.

1,519,689

UNITED STATES PATENT OFFICE.

FRANK P. MAXSON, OF CHICAGO, ILLINOIS.

FISH SCALER.

Application filed July 23, 1923. Serial No. 653,079.

*To all whom it may concern:*

Be it known that I, FRANK P. MAXSON, a citizen of the United States, residing at Chicago, in the county of Cook and State of Illinois, have invented a certain new and useful Improvement in Fish Scalers, of which the following is a full, clear, concise, and exact description, reference being had to the accompanying drawings, forming a part of this specification.

My invention relates to cutlery, and more specifically to an improved fish scaler particularly suitable for household or camping use.

One object of the invention is to provide a simple shape for the operating portion of the tool, which will, nevertheless, lend itself very readily to operation on all parts from which the scales must be removed. This problem is not as simple as it might seem, because a fish presents large flat areas which can only be efficiently scaled with a tool capable of engaging a relatively large area at one time, and also many depressions and corners near the various fins relatively inaccessible to a tool of large enough size to clean the large areas.

Marked advantages of the structure I have provided in pursuance of the above objects are extreme simplicity, minimum number of parts, cheapness of manufacture, strength and durability.

Further objects and advantages of the invention will become apparent as the description proceeds.

In the accompanying drawings:—

Fig. 1 is a perspective view of a tool according to the invention, indicating the manner of its use;

Fig. 2 is a plan view of the same tool; and

Fig. 3 is a section on line 3—3 of Fig. 2.

In the embodiment of my invention selected for illustration, the tool comprises in toto three simple pieces of sheet metal all of the same original cross section. The handle portion comprises smooth reaches 10 united at the rear end by a smoothly curved bight 12, and the operating portion comprises reaches 14 substantially parallel or converging only slightly throughout most of their length, and at their front ends diverging sharply as at 16 to terminate in horns 18 at the opposite ends of the arcuate dome 20. The third strip 22 is relatively short and operates as a cross-brace. Its ends are bent down as at 24 and lie outside the superposed ends of the handle and operating portions, all three thicknesses of metal at each end of the cross brace being firmly welded together by a single spot weld 26.

The operating portion is serrated throughout its entire length. The advantages of this in use are that the long reaches 14 can be used for cleaning the flanks or large areas of the body in relatively short time, while the dome 20 is serviceable for smaller areas, such as the back or belly between the fins. The horns 18 are particularly useful in working close beside the fins, and up under the gills, in short, in any place where only a relatively small tool can gain access to the parts.

The extreme simplicity and economy in manufacture of my device will be apparent. A complete manufacturing establishment need comprise only a pair of snips for cutting off the strips of material, a small spot welder, and a small filing machine for cutting the teeth on the operating portion. With such an outfit, the entire stock of material for manufacture would comprise sheet metal strip of one size only. Alternatively, stock band saw material before or after heat treatment could be carried in stock for making the operating portion, and the machinery for cutting the teeth would not be required.

Without further elaboration, the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me my the following claims:—

I claim:—

1. A fish scaler comprising, in combination, slightly converging serrated reaches diverging sharply at their ends, and an arcuate dome joining side ends.

2. A fish scaler comprising, in combination, slightly converging serrated reaches diverging sharply at their ends, an arcuate bight joining said ends, and extensions of said reaches forming a handle portion.

3. A fish scaler comprising, in combination, slightly converging serrated reaches diverging sharply at their ends, an arcuate bight joining said ends, extensions of said reaches forming a handle portion, and a U- shaped bight uniting the rear ends of said extensions.

4. A fish scaler comprising, in combination, slightly converging serrated reaches diverging sharply at their ends, an arcuate dome joining said ends, extensions of said reaches forming a handle portion, a U-shaped bight uniting the rear ends of said extensions, and a U-shaped cross brace where said extensions join said reaches.

5. A fish scaler comprising, in combination, slightly converging serrated reaches diverging sharply at their ends, an arcuate dome joining said ends, extensions of said reaches forming a handle portion, a U-shaped bight uniting the rear ends of said extensions, and a U-shaped cross brace where said extensions join said reaches, the legs of said cross brace being secured to the ends of said reaches and extensions.

6. A fish scaler comprising, in combination, a cross brace, a handle strip with its ends secured to said cross brace and extending in one direction, and a serrated strip with its ends secured to the ends of said handle strip and extending in the opposite direction.

7. A fish scaling tool having, in combination, a generally U-shaped serrated operating strip with all its teeth in the same plane, said strip comprising substantially parallel reaches terminating in an enlarged head, said head comprising laterally extending horns and an arcuate dome connecting said horns.

8. A fish scaler comprising, in combination, three generally U-shaped strips of sheet metal, each having one end secured to one end of each of the other two, said strips comprising two long strips and one short strip forming a cross-brace for the long strips.

9. A fish scaler comprising, in combination, three generally U-shaped strips of sheet metal, each having one end secured to one end of each of the other two, said strips comprising two long strips and one short strip forming a cross-brace for the long strips, one of said long strips being serrated to form an operating portion, and the other being smooth to form a handle portion.

In witness whereof, I hereunto subscribe my name this 21st day of July, 1923.

FRANK P. MAXSON.